US006165239A

United States Patent [19]
Hedrick et al.

[11] Patent Number: 6,165,239
[45] Date of Patent: Dec. 26, 2000

[54] AQUEOUS SULFOPOLYUREA COLLOIDAL DISPERSIONS, FILMS AND ABRASIVE ARTICLES

[75] Inventors: Steven T. Hedrick, Cottage Grove; Howard S. Creel, Oakdale; Subramanian Krishnan; John J. Stofko, both of St. Paul; Wayne K. Larson, Maplewood, all of Minn.

[73] Assignee: 3M Innovative Properties Company, St. Paul, Minn.

[21] Appl. No.: 08/901,140

[22] Filed: Jul. 28, 1997

[51] Int. Cl.$^7$ ............... B24D 3/28; B01J 13/00; C08J 5/14
[52] U.S. Cl. ............... 51/295; 252/311; 524/840
[58] Field of Search ............... 252/311; 524/840; 528/371, 68, 71, 77; 51/295

[56] References Cited

U.S. PATENT DOCUMENTS

| | | | |
|---|---|---|---|
| 2,958,593 | 11/1960 | Hoover et al. | 51/295 |
| 2,988,538 | 6/1961 | Thoma et al. | 528/68 |
| 3,708,333 | 1/1973 | Carlson | 117/140 |
| 3,826,769 | 7/1974 | Carlson | 260/29.2 |
| 3,941,733 | 3/1976 | Chang | 260/29.2 |
| 3,971,745 | 7/1976 | Carlson et al. | 260/29.2 |
| 3,993,614 | 11/1976 | Carlson | 524/840 |
| 3,998,870 | 12/1976 | Carlson | 528/71 |
| 3,998,871 | 12/1976 | Carlson | 528/71 |
| 4,049,396 | 9/1977 | Hiles | 51/295 |
| 4,108,814 | 8/1978 | Reiff et al. | 524/840 |
| 4,110,284 | 8/1978 | Violland et al. | 524/840 |
| 4,150,946 | 4/1979 | Neel et al. | 8/115.6 |
| 4,224,418 | 9/1980 | Dieterich et al. | 521/170 |
| 4,227,350 | 10/1980 | Fitzer | 51/295 |
| 4,307,219 | 12/1981 | Larson | 528/71 |
| 4,501,852 | 2/1985 | Markusch et al. | 524/840 X |
| 4,539,366 | 9/1985 | Gagne et al. | 524/507 |
| 4,558,149 | 12/1985 | Larson | 560/14 |
| 4,569,982 | 2/1986 | Grögler et al. | 528/68 X |
| 4,638,017 | 1/1987 | Larson et al. | 521/157 |
| 4,652,466 | 3/1987 | Thoma et al. | 427/244 |
| 4,696,760 | 9/1987 | Morimoto et al. | 252/311 X |
| 4,738,992 | 4/1988 | Larson et al. | 521/157 |
| 4,746,717 | 5/1988 | Larson | 528/68 |
| 4,774,937 | 10/1988 | Scholz et al. | 128/90 |
| 4,780,523 | 10/1988 | Chung | 528/76 |
| 4,855,384 | 8/1989 | Larson | 528/60 |
| 4,856,502 | 8/1989 | Ersfeld et al. | 128/90 |
| 4,922,675 | 5/1990 | Sato et al. | 51/295 X |
| 4,937,283 | 6/1990 | Chung | 524/839 |
| 5,039,733 | 8/1991 | Dormish et al. | 524/591 |
| 5,071,578 | 12/1991 | Ohkubo et al. | 252/62.54 |
| 5,085,941 | 2/1992 | Ohkubo | 428/424.6 |
| 5,110,843 | 5/1992 | Bries et al. | 521/159 |
| 5,118,850 | 6/1992 | Bowman et al. | 564/470 |
| 5,134,035 | 7/1992 | Kumar et al. | 428/425.9 |
| 5,203,884 | 4/1993 | Buchanan et al. | 51/295 |
| 5,218,072 | 6/1993 | Kumar et al. | 528/59 |
| 5,240,972 | 8/1993 | Kumar et al. | 522/57 |
| 5,244,739 | 9/1993 | Carlson et al. | 428/425.9 |
| 5,260,136 | 11/1993 | Ohkubo et al. | 428/425.9 |
| 5,344,873 | 9/1994 | Blum | 524/591 |
| 5,367,017 | 11/1994 | Rosthauser et al. | 524/589 |
| 5,427,835 | 6/1995 | Morrison et al. | 428/96 |
| 5,468,498 | 11/1995 | Morrison et al. | 524/408 |
| 5,531,039 | 7/1996 | Gore | 42/101 |
| 5,609,969 | 3/1997 | Clatanoff et al. | 428/632 |
| 5,610,232 | 3/1997 | Duan et al. | 524/840 |
| 5,637,639 | 6/1997 | Duan et al. | 524/591 |
| 5,679,754 | 10/1997 | Larson et al. | 528/28 |
| 5,703,158 | 12/1997 | Duan et al. | 524/840 X |

FOREIGN PATENT DOCUMENTS

| | | |
|---|---|---|
| 0 717 057 A1 | 6/1996 | European Pat. Off. . |
| WO 97/10273 | 3/1997 | WIPO . |

*Primary Examiner*—Richard D. Lovering
*Attorney, Agent, or Firm*—Paul W. Busse

[57] ABSTRACT

The present invention relates to stable aqueous colloidal dipersions of sulfopolyureas and self supporting films formed from the dispersions which display good mechanical properties from about room temperature to temperatures exceeding 150° C. The films of the invention, which are formed with no volatile organic compound (VOC) emissions and no post-coating chemical or ionic cross-linking, are not redispersible in water and may be used to form heat resistant abrasive articles.

35 Claims, 4 Drawing Sheets

AQUEOUS SULFOPOLYUREA COLLOIDAL DISPERSIONS, FILMS AND ABRASIVE ARTICLES

BACKGROUND

The present invention relates to stable aqueous colloidal dipersions of sulfopolyureas and self supporting films formed from the dispersions which display good mechanical properties from about room temperature to temperatures exceeding 150° C. The films of the invention, which are formed with no volatile organic compound (VOC) emissions and no post-coating chemical or ionic cross-linking, are not redispersible in water and may be used to form heat resistant abrasive articles.

Polyurethanes are a well established class of high performance polymers which can be readily tailored to display a unique combination of tensile strength, toughness, and flexibility. As a result of this versatility, polyurethanes have found utility in a variety of applications including binder resins, abrasion resistant coatings, protective coatings, and membranes.

Polyurethanes may be delivered to a substrate as a thermoplastic or thermoset material by an extrusion process, as a moisture cure or two part curable system, generally from an organic solvent, or as an aqueous dispersion of a colloidal polymer system. Two part polyurethanes are generally used in binder or coating applications where they are delivered from mixtures of organic solvents, blocked isocyanate terminated compounds, and polyols, or mixtures of organic solvents, a diisocyanate terminated compound, and polyols.

Aqueous polyurethane dispersions have been developed as a means to deliver polyurethane coatings to substrates such as fibers, textiles, and paper. They offer advantages over two part polyurethane systems in that they have reduced volatile organic compound (VOC) emissions, they may eliminate exposure to toxic isocyanate or diamine compounds during coating, and they provide simplified overall processing.

Attempts to improve the thermal stability and flow resistance properties of aqueous polyurethane materials by incorporation of crosslinking monomers which react with the polyurethane backbone (e.g. epoxy resins) have been only partially successful. Improved high temperature performance has typically been achieved at the expense of reduced toughness and elongation, and dramatically increased modulus.

SUMMARY OF THE INVENTION

The present invention relates to stable aqueous sulfopolyurea colloidal dispersions comprising a plurality of units (a) and (b) having the formula (a)

(b)

interconnected by segments having the formula wherein each $R_1$ is independently a divalent aliphatic group having an average molecular weight of 200 to 600 comprising ether or ester functional groups preferably including $-CH_2-CH_2-(OCH_2-CH_2-)_n-$, $-C(CH_3)H-CH_2-(OC(CH_3)H-CH_2-)_n-$, and $-O-(CH_2)_m-CO-[-O-(CH_2)_m-CO-]_n-$ groups;

each $R_2$ is independently a divalent straight or branched chain alkylene group or cycloaliphatic group having 2 to 15 carbon atoms or a divalent aliphatic group having a molecular weight of 200 to 2,000 comprising ether or ester functional groups preferably including $-CH_2-CH_2-(OCH_2-CH_2-)_n-$, $-C(CH_3)H-CH_2-(OC(CH_3)H-CH_2-)_n-$, $-CH_2-CH_2-CH_2-CH_2-(OCH_2CH_2-CH_2-CH_2)_n-$, and $-O-(CH_2)_m-CO-[-O-(CH_2)_m-CO-]_n-$ groups;

each $R_3$ group is a methylene-4,4'-diphenyl group, a 1,4-phenyl group, a 4,4'-biphenyl group, a 1,6-napthyl group, a N,N-di((p-methylphenyl)phenyl)carbodiimide group, or mixtures thereof; m is an integer from about 2 to about 5; n is an integer from about 2 to about 15; x equals 1; y is an integer between 0 and 4; z is an integer between 0 and 6; and M is a sodium, lithium, or potassium cation. The sulfopolyurea compositions have a sulfonate equivalent weight of from about 1,000 to about 8,500.

The invention also relates to self-supporting films as well as heat-resistant abrasive articles which use the sulfopolyurea dispersions of the present invention. Such abrasive articles comprise an organic matrix with a novel, tough, thermally-stable, adherent elastomeric resinous binder system, comprising a sulfopolyurea.

These abrasive articles can be urged against a workpiece at high pressure and high speed with little or no undesirable surface smearing or transfer to the workpiece surface.

In this application:

"colloidal dispersion" means a discrete distribution of particles having an average size of less than about 1 micron, typically less than about 500 nanometers, in an aqueous media (typically water);

"crystalline melt point," $T_m$, is the temperature at which the last trace of crystallinity disappears under equilibrium conditions;

"ester/urethane containing" means divalent alkyl groups which contain carboxylic acid ester or urethane connecting groups;

"hard segment" means the urethane and urea linkage containing segments of the sulfopolyurea chain (most generally formed by the reaction of isocyanate groups and amine or alcohol derived functional groups) which are associated through hydrogen bonding;

"phase separated" means the morphological phenomena in a polyurea coating or film wherein descrete regions of hard and soft segments are formed by association of the hydrogen bonding hard segment interactions;

"polyurea" means a polymer obtained by a polymerization reaction in which the mechanism of chain growth is entirely the formation of urea and biuret linkages by the reaction of isocyanate groups with amine or urea groups, with urea linkage formation predominating;

"soft segment" means that portion of the polyurea backbone which is located between hard segments, typically comprising one or more polyols contained within the polymer backbone;

"stable aqueous colloidal dispersion" means a uniform dispersion polymer particles having an average diameter of from about 10 nanometers to about 1 micron in water which do not agglomerate in the absence of agitation (either continuous or intermittent);

"sulfonate equivalent weight" means the sum of the atomic weights of all of the atoms in the sulfopolyurea divided by the number of sulfonate groups contained in the polymer molecule;

"sulfopolyurea" means a high molecular weight polyurea containing a plurality of sulfonate groups covalently bonded to and pendant from the polymer chain; and "tensile storage modulus (E')" is a measure of the stiffness of a material at a given temperature, obtained by measuring the response of the material to an imposed oscillatory tensile strain at the temperature of interest.

DETAILED DESCRIPTION OF THE INVENTION

The present invention provides for stable aqueous sulfopolyurea colloidal compositions comprising one or more soft hydrophilic segments comprising a centrally disposed triaryl group comprising a sulfonic acid salt and two carboxylic acid ester groups, the ester groups further comprising divalent alkyl radicals containing ether or ester functionalities, and optional modifying groups comprising a divalent straight or branched chain alkylene group or cycloaliphatic group, the soft hydrophilic segments and optional modifying segments are preferably interconnected by hard segments which comprise at least a diad of diphenyl methane groups, 1,4-phenyl groups, 4,4'-biphenyl groups, 1,6-napthyl groups, N,N-di((p-methylphenyl)phenyl)-carbodiimide groups, or mixtures thereof interconnected by urea groups.

The sulfopolyurea compositions of the present invention have a significantly higher hard segment content than conventional polyurea compositions which are solvent soluble or moisture cured compositions as the chain extended crystallizable hard segment is formed during the polymerization/dispersion step. Conventional aqueous dispersible polyurea or polyurethane/urea compositions are limited to hard segments which do not crystallize or which are present in low concentrations to permit prepolymer processing. As a result of the high hard segment content, films based on the sulfopolyurea compositions of the present invention are substantially insensitive to water and are not redispersible in water without post film formation crosslinking. Additionally, films based on the sulfopolyurea compositions of the present invention unexpectedly exhibit significantly better high temperature properties than conventional polyurethane/urea compositions, shoving little or no flow at temperature in excess of 150° C. and comparatively low losses in storage modulus at temperatures in excess of 100° C.

The sulfopolyurea compositions of the present invention comprise polymers having a plurality of segments (a) and (b) having the formula (a)

(b)

interconnected by segments having the formula wherein;

each $R_1$ is independently a divalent aliphatic group having an average molecular weight of 200 to 600 comprising ether or ester functional groups, each $R_2$ is independently a divalent straight or branched chain alkylene group or cycloaliphatic group having an average of 2 to 15 carbon atoms or a divalent aliphatic group having an average molecular weight of 200 to 2,000 comprising ether or ester functional groups, $R_3$ is a methylene-4,4'-diphenyl group, a 1,4-phenyl group, a 4,4'-biphenyl group, a 1,6-napthyl group, a N,N-di((p-methylphenyl)phenyl)-carbodiimide group, or mixtures thereof;

m is an integer from about 2 to about 5;

n is an integer from about 2 to about 15;

x is equal to 1;

y is an integer between 0 and 4;

z is an integer between 0 and 6; and

M is a sodium, lithium, or potassium cation.

The sulfopolyurea compositions of the invention preferably have a sulfonate equivalent weight of from about 1,000 to about 8,500, more preferably from about 2,500 to about 7,000 and a hard segment content of from about 20 wt. % to about 60 wt. %, preferably from about 30 wt. % to about 50 wt. %.

Preparation of the sulfopolyureas of the invention is schematically depicted in the reaction sequence shown below. In this reaction sequence, sulfopolyol (III) is prepared by transesterification reaction of dimethyl-5-sodiosulfoisophthalate (I) with a polyol (II) in Step 1. A prepolymer is subsequently prepared from the sulfopolyol in Step 2 where sulfopolyol (III) is converted into an isocyanate terminated sulfoprepolymer (V) by reaction with a polyisocyanate (IV). When an excess of polyol (II) is used in Step 1, the reaction product of Step 2 comprises a mixture of isocyanate terminated sulfoprepolymer (V) and isocyanate terminated polyol (VI). It is understood that the term excess polyol includes excess of the polyol used in the initial transesterification reaction or adding more of the same polyol or a different polyol to the reaction product of the transesterification reaction, wherein the different polyol includes lower molecular weight polyols having molecular weights in the range of from about 62 to about 200. The reaction product of Step 2 may also contain unreacted/excess polyisocyanate (VI). The isocyanate-terminated sulfoprepolymers produced by the above described process are described in U.S. Pat. Nos. 4,558,149, 4,746,717, and 4,855,384, which are incorporated herein by reference.

Alternatively, sulfopolyol (III) may be reacted with a lactone to form a lactonized sulfo-organodiol which is subsequently reacted with a polyisocyanate to form an isocyanate-terminated sulfoprepolymer. A colloidal dispersion of a sulfopolyurea (VI) may be prepared from the isocyanate terminated sulfoprepolymer (V) [or prepolymer mixture (V, VI, and II)] in, Step 3 by injecting the isocyanate terminated sulfoprepolymer-prepolymer (V) [or prepolymer mixture (V, VI, and II)] into a microfluidizer and maintaining high shear agitation of the reaction mixture at approximately 70° C. under a $N_2$ atmosphere for a period of from about 5 to about 60 minutes. Other mixing methods may be employed which provide adequate levels of shear or agitation in order to avoid formation of macroscopic gel particles. Free standing films were prepared from the colloidal dispersions of the sulfopolyureas (VII) by spin casting or other standard film forming techniques.

Polyols (II) suitable for use in the preparation of the sulfopolyols (III) are typically lower molecular weight diols, including, but not limited to, 400 average molecular weight polyethylene glycol (available from DuPont Chemicals, Wilmington, Del.), 600 average molecular weight polyethylene glycol (available from Union Carbide Chemical and Plastics Co., Inc., Danbury, Conn.), 425 average molecular weight polypropylene glycol (available from Arco Chemical, Newton Square, Pa.), and polycaprolactonediol (PCP-200, available from Union Carbide Corp.).

Sulfopolyols (III) are prepared under typical transesterification reaction conditions, using one or more of the indicated polyols (II), dimethyl-5-sodiosulfoisophthalate (I), and a transesterification reaction catalyst. Methanol is distilled from the reaction mixture to drive the reaction to completion. Sulfopolyol (III) can be prepared utilizing a single polyol or a mixture of two or more polyols. Typically an excess of polyol (II) (up to as much as a 4:1 molar excess polyol relative to dimethyl-5-sodiosulfoisophthalate) is used in the formation of the sulfopolyol (III), producing a mixture of sulfopolyol (III) and polyol (II) which is carried over to the isocyanate terminated sulfoprepolymer in Step 2.

REACTION SEQUENCE

Polyisocyanates (IV) used in the preparation of the isocyanate terminated sulfoprepolymer (V) have a high aromatic content to promote hard segment formation and subsequent phase separation in the final sulfopolyurea (VII). Suitable polyisocyanates include, but are not limited to, 4,4'-diisocyanatodiphenyl methane (available from Aldrich Chemical Co., Milwaulkee, Wis.), 1,4-diisocyanatobenzene, 4,4'-diisocyanatobiphenyl, 1,6-diisocyanatonapthene and Isonate 2143L (available from Dow Chemical Corp., Midland, Mich.), or mixtures of two or more of the same. The isocyanate terminated sulfoprepolymer (V) can be prepared utilizing a single sulfopolyol or a mixture of a sulfopolyol (III) and one or more polyols (II). Prepolymer (V) formation reaction typically utilizes excess of polyisocyanate (III) (approximately 1 to 50 mole % excess of the isocyanate groups relative to hydroxyl end groups), which produces a mixture of isocyanate terminated sulfoprepolymer (V), isocyanate-terminated polyol (VI) and unreacted polyisocyanate (IV).

Amounts of the sulfopolyols and polyisocyanate reactants are adjusted to produce sulfopolyurea compositions having from about 20 wt. % to about 60 wt. %, preferably from about 30 wt. % to about 50 wt. % hard segment content.

Injecting the isocyanate-terminated sulfoprepolymer (V) [or the mixture of (V), (VI), and (II)] into water with sufficient agitation to avoid macroscopic gel formulation, such as those produced using a microfluidizer, produces a colloidal dispersion of precursors that ultimately produce the sulfopolyureas (VII) of the present invention. Subsequent to being introduced into the aqueous environment, a portion of the isocyanate groups are hydrolyzed to amino groups which, in turn, react with unhydrolyzed isocyanate groups to form the urea linkages of the sulfopolyureas (VII). This process produces a discreet distribution or dispersion of sulfopolyurea (VII) particles less than one micron in diameter, typically ranging from about 10 nanometers to about 500 nanometers in diameter, in water. The dispersions have a translucent, bluish appearance characteristics of a colloidal dispersion. The particles have sufficient hydrophilicity imparted to them by the pendant sulfonate groups that the dispersion displays good stability, showing substantially no agglomeration in the absence of stirring or agitation under extended storage at ambient conditions without supplemental surfactants. Supplemental surfactants may be added to the dispersions to, for example, facilitate wetting various substrates, without adversely effecting the stability of the dispersion.

The dispersions can be applied to a variety of substrates, including, but not limited to metals, plastics, wood, etc. to form protective coatings. The dispersions can also be applied to fibrous substrates to provide a polyurea binder to the substrate.

Free standing or self supporting films are readily prepared from the colloidal dispersions by removing water from the composition and allowing the particles to coalesce. Conventional spin casting or film coating techniques can be utilized to form these films. Cosolvents may be added to the aqueous dispersions to facilitate film formation and or wetting of substrates without adversely impacting the stability of the colloidal dispersions of the invention.

The thus produced sulfoprepolymer polyurea films undergo phase separation on removal of water, separating into substantially amorphous, soft segments comprising segments of sulfopolyurea which contains a centrally disposed triaryl group comprising a sulfonic acid salt and two carboxylic acid ester groups, the ester groups further comprising divalent alkyl radicals containing ether or ester functionalities, and semicrystalline hard segments comprising segments comprising the urethane and urea linkage containing segments of the sulfopolyurea chain. While this phase separation occurs at ambient temperatures, it can be accelerated by annealing the films at elevated temperatures. Typical annealing temperatures range from 40–70° C. By carefully selecting the annealing conditions; (i.e., time and temperature), it is possible to promote crystallization in the hard segment of the sulfopolyureas of the present invention to achieve $T_m$'s in excess of 300° C. for those segments.

Figure 1:
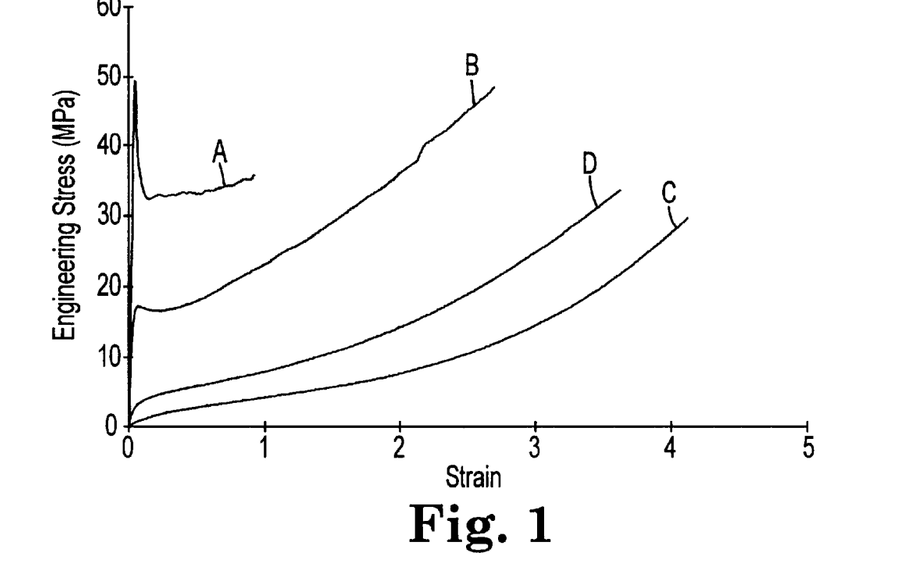
FIG. 1 is a trace of the tensile data curves for the sulfopolyurea films prepared as described in Examples 1–4.
Figure 4:
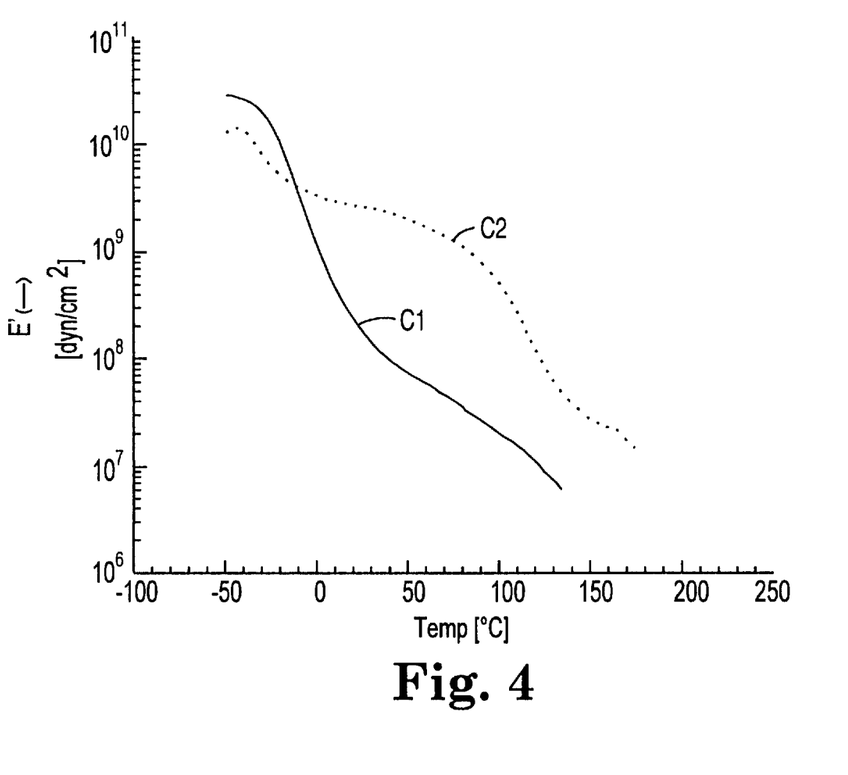
FIG. 4 is a trace of DMA data, plotting E' as a function of temperature, of films prepared from two commercially available waterborne polyurethanes (Comparative Examples C1 & C2).
Figure 5:
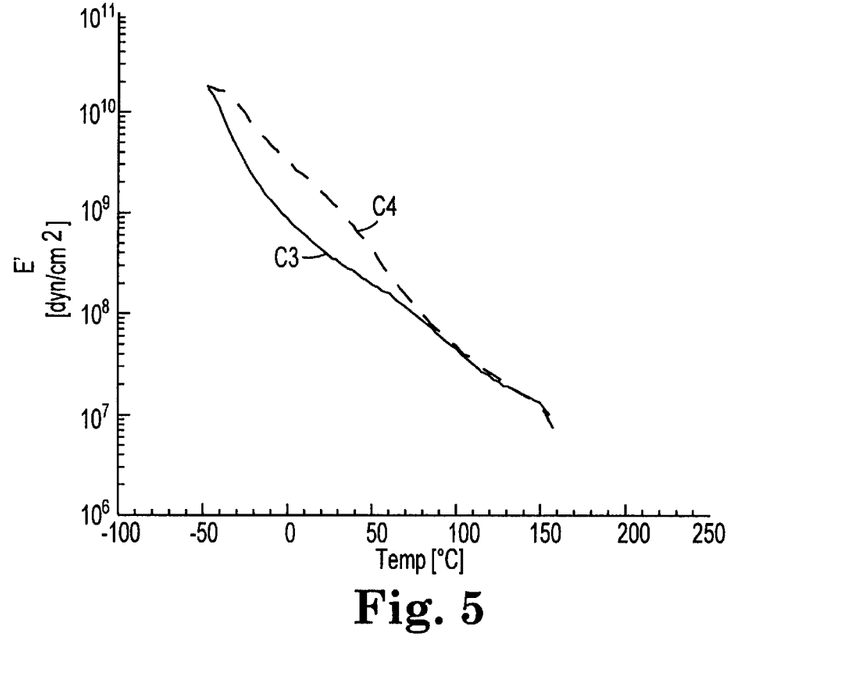
FIG. 5 is a trace of DMA data, plotting E' as a function of temperature of films prepared from two commercially available waterborne polyurethanes (Comparative Examples C3 & C4).
Figure 6:
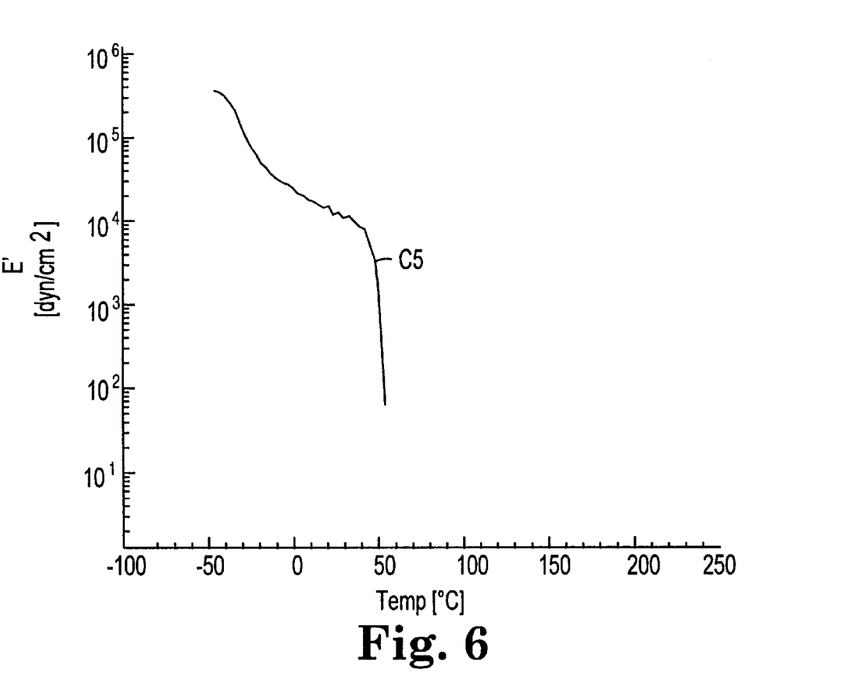
FIG. 6 is a trace of DMA data, plotting E' as a function of temperature of a film prepared from commercially available waterborne polyurethanes (Comparative Example C5).

The unexpected high temperature performance properties of films prepared from the sulfopolyurea compositions of the present invention are apparent from an examination of Thermal Gravimetric Analysis (TGA) and Dynamic Mechanical Analysis (DMA) data of films prepared from sulfopolyurea compositions of the present invention in comparison to similar data for films prepared from commercially available water borne polyurethane/urea compositions. The thermal stability of the sulfopolyureas relative to the comparative polyurethane/ureas is dramatically demonstrated in the TGA analysis of the sulfopolyureas and comparative polyurethane/ureas wherein film samples were subjected to 550° C. under a $N_2$ atmosphere. In all cases, the sulfopolyurea compositions of the present invention had residues after exposure to 550° C. of at least 12% to as high as 27% relative to the weight of the original unheated sample while the comparative polyurethane/ureas had residues less than about 3%. DMA also demonstrates the unexpected high temperature performance properties of the sulfopolyurea compositions of the present invention. In FIG. 1, DMA curves for tensile storage modulus (E') of the film as a function of temperature are plotted for films of the sulfopolyureas of the present invention. Curves A–D, corresponding to the compositions of Examples 1–4 respectively, all show initial E' value:s which plateaus to about 0–50° C., followed by a drop as the film temperature reaches approximately 40–75° C., at which point the E' substantially plateaus to temperatures in excess of approximately 150° C. Corresponding DMA data for films based on the comparative, commercially available waterborne polyurethane/ureas are presented in FIGS. 4–6. In all cases the E' value for these films shows a steady decline with increasing film temperature.

Analysis of this data provides a measure of the retention of the storage modulus and the stiffness as a function of increasing temperature. More specifically, E' losses of from about 13% to 77% were observed over the temperature range of 100–135° C. and E' losses from about 9% to 133% over the temperature range of 100–200° C. were observed for the sulfopolyurea compositions of Examples 1–4. This stands in contrast to E' losses of from about 126% to about 902% over the temperature range of 100–135° C. for Comparative Examples C1–C4. E' changes over the temperature range of 100–200° C. could not be determined for the Comparative samples as they became too soft and the modulus, of the softened samples was below the detection limits of the analytical instrumentation.

Adjuvants, including but not limited to antistatic agents, biocides, fillers, grinding aides, lubricants, pigments and rhelogical additives can be incorporated into the sulfopolyurea compositions of the present invention without adversely impacting the thermal properties of the compositions.

The abrasive products of the present invention may take any of a variety of conventional forms such as sheets, blocks, strips, belts, brushes, rotary flaps, discs, or solid or foamed wheels. Especially useful forms are wheels in the form of a disc or right circular cylinder having dimensions which may be very small, e.g., a cylinder height on the order of a few millimeters, or very large, e.g., two meters or more, and a diameter which may be very small, e.g., on the order of a few centimeters, or very large, e.g., one meter or more. The wheels typically have a central opening for support by an appropriate arbor or other mechanical holding means to enable the wheel to be rotated in use. Wheel dimensions, configurations, means of support, and means of rotation are well known in the art.

The matrix may be either a solid or foamed organic polymer or a nonwoven fibrous web. Such matrices are also well known in the prior art. An example of a lofty, nonwoven fibrous matrix formed of crimped staple fibers adhered at points of contact with binder which contains abrasive particles is taught in U.S. Pat. No. 2,958,593 (Hoover et al.). U.S. Pat. No. 4,227,350 (Fitzer) discloses a matrix formed of three-dimensionally undulated inter-engaged autogenously bonded continuous filaments. The disclosures of these patents are incorporated herein by reference.

The abrasive products of the present invention may be prepared by appropriate techniques which are also well known in the art. For example, a wheel shape may be die cut from a slab of the abrasive material. Additionally, ribbons, strips, or elongate segments of the abrasive material may be spirally wound into a wheel shape while the binder system is uncured or partially cured and then cured to yield a wheel. Furthermore, uncured or partially cured webs can be cut into sheets or discs which are stacked on one another and then compressed and cured under compression to make a higher density abrasive product. Such formation techniques are well known to those skilled in the art.

The abrasive articles of this invention are suitable for use in a wide variety of applications. They may be adapted for use on any workpiece composition including metal, wood, plastics, composites, glass, ceramics, concrete, and others. They may be designed for the aggressive removal of material from a workpiece, clean a workpiece in preparation for painting, plating, etc., to buff a surface to a bright finish, or to delicately wipe a surface free from liquids, etc.

Preferred abrasive articles according to the present invention may include a plurality of coatings, though only a single coating is essential to realize its benefits. For example, a nonwoven web may be lightly coated with a hard thermosetting binder or a tough, elastomeric binder to create a substrate for subsequent coatings. This initial coating is known as a "prebond". A second, or "make" coating may then be applied to further strengthen, further harden, further toughen, and/or provide more abrasive particles to the composite. A third, or "size" coating may be then applied to further apply abrasive particles and/or to further strengthen the abrasive composition. The sulfopolyurea binder system of this invention may be used in any or all of the coatings and, as is evidenced in this disclosure, is capable of supplying all of the qualities needed to produce such an abrasive composition. Optionally, for a particular abrasive article, all coatings applied thereto may consist essentially of the binder system of the present invention.

Test Procedures

TGA (Thermal Gravimetric Analysis)

Thermal gravimetric analyses were run on a TA Instruments TGA (available from TA Instruments, Amherst, Mass.). The temperature was ramped from 200° C. to 550° C. at 10° C./minute under nitrogen. Percent residue was measured after constant weight loss at 550° C.

DMA (Dynamic Mechanical Analysis)

DMA spectra were generated on a Rheometrics RSA II dynamic mechanical analysis instrument (available from Rheometrics Scientific, Piscataway, N.J.). Samples of typical dimension 20–25 mm long, 7 mm wide, and 0.2–0.7 mm thick were mounted in a fiber/film fixture and a static tensile force applied to prevent sample buckling. An oscillatory strain was applied to the sample at 10 rad/sec and the resulting sinusoidal stress measured as a function of temperature. A typical temperature sweep profile was from −50 to 250° C. at 5° C./min. Correlation of the sinusoidal stress response with the imposed strain allows calculation of the tensile storage modulus (E'), the tensile loss modulus (E") and tan δ. Glass transition temperatures were determined by the temperature corresponding to the first maxima in the tan δ. Plots were generated for each material which measure storage modulus as a function of temperature in order to measure flow resistance as a function of temperature.

Tensile Analysis

Tensile measurements were made on a Sintech machine (available from Sintech, Inc., Research Triangle Park, N.C.) at a rate of 12.54 cm/min. Samples were die cut into dogbone shapes, 2.54 cm in length and 0.47 cm in width. Three replicates were taken of each sample.

Particle Size Determination

The particle size was determined using standard dynamic light scattering methods using a Malvern PCS 4700 instrument (available from Malvern Instruments LTD., MALVERN Worcs UK, Malvern Instruments Ltd., Spring Lane South MALVERN Worcs WR14 1XZ, UK) equipped with a 75 mW Argon laser. The concentrated dispersions were prefiltered through a 5 μm nylon filter and then diluted to 0.001 wt. % using filtered (0.45 μm) DI water and analyzed. Five measurements were made and the values averaged. The output provides results an average diameter and polydispersity as determined by Cumulents analysis.

Differential Scanning Calorimetry (DSC)

Typically, approximately 10 mg sample of the material of interest is placed in a sample pan, and placed on the sample head of a DSC instrument (TA Instruments; New Castle, Del.). The temperature of the sample chamber is raised in a controlled fashion and energy is supplied at a varying rate to the sample to keep a constant temperature relative to an empty reference pan on a reference head. The energy supplied to the sample relative to the reference is plotted as a function of temperature. Typically, the trace is presented indicating endothermic transitions, such as melting points, in the downward direction.

WAXS Spectra Procedure

Film samples were examined by wide angle X-ray scattering techniques employing a Philips vertical diffractometer (reflection geometry, available from Philips Electronic Instruments Company, Mahwah, N.J.), copper $K_\alpha$ radiation, and proportional detector registry of the scattered radiation. The diffractometer is equipped with variable entrance slits, fixed exit slits, and graphite diffracted beam monochromator. Step-scans were conducted within the 5 to 55 degree (2θ) scattering angle range using a 0.04 degree step size and 4 second dwell time. Generator settings were 40 kV and 35 mA. Analysis of the resulting data was performed using Philips PC-APD software. High temperature scans were conducted using a similar diffractometer fitted with a platinum strip furnace and Paar HTK controller Smear Test The procedure for testing the tendency of an abrasive wheel to transfer parts of itself to a workpiece, or smear, is as follows.

Wheels of 75 mm diameter with a 9.5 mm center hole and being 6 mm thick were mounted on the arbor of an air powered tool which was rotated at no-load rate of 14,000 to 18,000 revolutions per minute. The tool was stationarily supported and loaded to force the wheel against the test workpiece. The rotating wheel was forced at 35.6 N (or sufficient force to cause a control sample to smear) against a 60 mm by 300 mm titanium metal plate which was mounted on a traversing table that moved, causing the wheel to make a 200 mm long path on the metal plate at the rate of 25 mm per second.

For comparative purposes, the tendency of an abrasive article to transfer material to smear is subjectively rated by the following scheme:

| Rating | Observation |
| --- | --- |
| 1 | No transfer |
| 2 | Very slight transfer |
| 3 | Significant and objectionable transfer |
| 8 | Large amounts of transfer |
| 10 | Gross amount of transfer |

EXAMPLES

Polyol Preparation

Preparation of Sulfopolyol A

A reactor equipped with a mechanical stirrer, nitrogen purge, and distillation apparatus was charged with dimethyl-5-sodiosulfoisophthalate (42.6 g, 0.144 moles, available from Du Pont Chemicals) 400 molecular weight polyethylene glycol (115.1 g, 0.288 moles, available from Union Carbide Chemical and Plastics Co., Inc.), and 425 molecular weight polypropylene glycol (122.3 g, 0.288 moles, available from Arco Chemical Co.), and xylene (75 g). The reactor was slowly heated to 220° C. over a period of 1 hour to remove the xylene. Zinc: acetate (0.2 g) was then added to the contents of the flask and the temperature of the reaction mixture held at 220° C. for 4 hours with concommitment distillation of methanol from the reaction. The temperature was then reduced to 160° C. and 0.2 torr vacuum applied to the reaction mixture for 30 minutes. The contents of the flask were subsequently cooled to 120° C. under nitrogen and drained to yield a clear, colorless liquid polyol. The OH equivalent weight of this polyol was found to be 310 g/mole OH (theoretical OH of 320). The theoretical sulfonate equivalent weight of the polyol mixture is 1882 g polymer/mole sulfonate.

Preparation of Sulfopolyol B

Sulfopolyol B was prepared substantially according to the procedure described for the preparation of Sulfopolyol A except that the reactant charge was dimethyl-5-sodiosulfoisophthalate (27.5 g, 0.09 moles), 600 molecular weight polyethylene glycol (222.6 g, 0.37 moles, available from Union Carbide Chemical and Plastics Co., Inc.), and xylene (75 g). The OH equivalent weight of this polyol was 425 g/mole OH (theoretical OH of 439) and the theoretical sulfonate equivalent weight was 2632 g polymer/mole sulfonate.

Preparation of Sulfopolyol C

A sulfopolyester polyol was prepared generally following the procedure in Example 1 of U.S. Pat. No. 4,746,717. The reactor was equipped with a mechanical stirrer, a nitrogen purge system, distillation head, and receiving flask, and set for vacuum distillation and the receiving flask was cooled using a dry ice/acetone bath. The reactor was charged with dimethyl 5-sodiosulfoisophthalate (296 g, 1 mole) and polycaprolactonediol (1060 g, 2 moles), PCP-0200 available from Union Carbide Chemical and Plastics Co., Inc.). The contents of the flask were heated to 230° C. under agitation and nitrogen purge and tetraisopropyl titanate (0.13 g) added as an esterification catalyst. The reaction mixture was maintained at 230° C. for a period of 4 hours, during which 50 to 75 percent of the methanol condensate was removed. The pressure in the reactor was reduced to 20 torr and held for 15 minutes followed by back-filling the system with nitrogen. A low viscosity product removed from the flask while hot. This polyol had a hydroxyl equivalent weight of 840 moles of OH per gram of polymer and a theoretical sulfonate equivalent weight of 1292 g polymer/mole sulfonate.

Example 1

Isocyanate-Terminated Sulfo-prepolymer Synthesis

A reactor equipped with a mechanical stir and nitrogen purge was charged with 4,4'-diisocyanatodiphenyl methane (183.9 g, 0.736 moles, available from Bayer Corp, Pittsburgh, Pa.) and ethane sulfonic acid (0.25 g, available from Aldrich Chemical Company; Milwaukee, Wis.) and the mixture heated to 70° C. Polyol A (216.1 g) was slowly added to the reaction mixture over a period of 30 minutes with stirring (NCO:OH endcapping ratio of 2.1:1). The mixture was heated for an additional 5 hours and drained under nitrogen purge to yield a viscous, clear liquid.

Sulfopolyurea Dispersion Synthesis

Deionized water (1000 g) was charged to an HC-8000 Microfluidizer (Microfluidics, Inc., Newton, Mass.) equipped to recirculate through a heat exchanger at a temperature of 68° C. The isocyanate-terminated prepolymer (175 g) described above was pre-heated to 85° C. and then injected into the microfluidizer operating at a pressure of 50 MPa over a period of 20 minutes yielding a stable, translucent bluish dispersion at 18% solids and pH 7. Average particle size was found to be approximately 40 nm by laser light scattering as described above. The theoretical sulfonate equivalent weight of the dispersed polymer was 3387 g polymer/mole sulfonate and the hard segment content was 45%.

Figure 2:
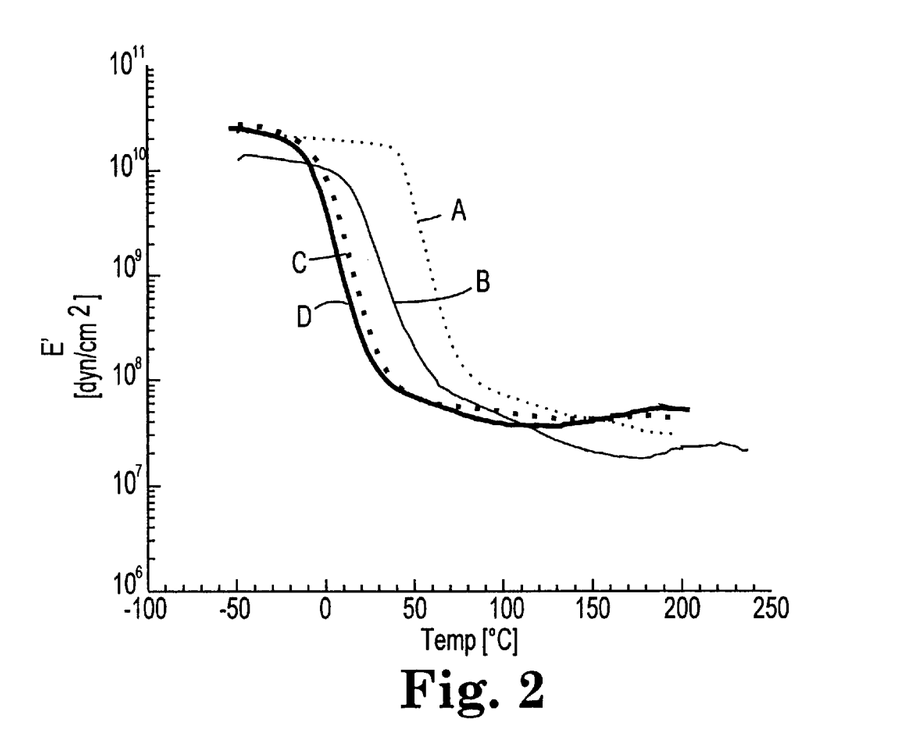
FIG. 2 is a trace of the Dynamic Mechanical Analysis (DMA) data, plotting Tensile Storage Modulus (E') as a function of temperature, of the sulfopolyurea films prepared as described in Examples 1–4.

Approximately 50 g of the thus prepared dispersion was injected into a rapidly spinning Teflon drum held at 55° C. for 12 hours to yield a clear 19 mil thick sulfopolyurea film which had a $T_g$ of 65.1° C. by DMA. The film was not dispersible in boiling water, had a yield stress of 49.4 MPa at a strain of 0.05, a breaking stress of 35.7 MPa, elongation at break of 93%, and Young's modulus of 1,486 MPa (FIG. 1, Curve A) as determined by testing according to the procedure for tensile analysis described above. TGA analysis as described above indicated 20.0% residue after heating the film to 550° C. under nitrogen. The DMA data for E' as a function of temperature of the film is shown in FIG. 2, Curve A.

Example 2

Isocyanate-Terminated Sulfo-prepolymer Synthesis

A reactor equipped with a mechanical stirrer and nitrogen purge was charged with 4,4'-diisocyanatodiphenyl methane (126.6 g, 0.506 moles) and ethane sulfonic acid (0.13 g) and heated to 70° C. Polyol A (113.2 g) and 1000 molecular weight polypropylene glycol (60.3 g, 0.06 moles, Arco Chemical Co.) were premixed, and then slowly added to the reaction mixture over a period of 30 minutes with stirring (NCO:OH endcapping ratio of 2.1:1). The mixture was heated for an additional 5 hours at 70° C. and drained under a nitrogen purge, yielding a viscous, clear liquid.

Sulfopolyurea Dispersion Synthesis

The isocyanate-terminated sulfo-prepolymer was preheated to 85° and dispersed into deionized water (1000 g) according to the procedure described in Example 1 to produce a stable, bluish-white dispersion containing 17% solids, which had a theoretical sulfonate equivalent weight 4864 g polymer/mole sulfonate, a hard segment content of 41%, and an average particle size of 106 nm, with a Polydispersity Index of 0.17.

A free standing film of the sulfopolyurea had a $T_g$ of 37.8° C. by DMA, was not dispersible in boiling water, had a breaking stress of 48.6 MPa, elongation at break of 263%, no yield stress, and Young's modulus of 476 MPa (FIG. 1, Curve B). TGA analysis as described above indicated 12.1% residue after heating the film to 550° C. under nitrogen. The DMA data for E' as a function of temperature of the film is shown in FIG. 2, Curve B.

Example 3

Isocyanate-Terminated Sulfoprepolymer Synthesis

The procedure of Example 3 was repeated using a charge of polyol B (205.1 g), 1000 molecular weight polypropylene glycol (79.5 g, 0.08 moles), Isonate 2143L (196.4 g), and ethane sulfonic acid (0.1 g) (endcapping ratio NCO:OH of 2.1:1).

Sulfopolyurea Dispersion Synthesis

The isocyanate-terminated sulfo-prepolymer (175 g) was dispersed in deionized water (800 g) according to the procedure of Example 1 to yield a stable white dispersion which contained 18% solids, had a theoretical sulfonate equivalent weight of 5850 g polymer/mole sulfonate, a hard segment content of 40%, and an average particle size of 91 nm with a Polydispersity Index of 0.14. A free standing film of this sulfopolyurea produced as described above had a $T_g$ of 18.9° C. by DMA was not dispersible in boiling water, had a breaking stress of 29.8 MPa, elongation at break of 412%, no yield stress, and Young's modulus of 13.0 MPa (FIG. 1, Curve C). TGA analysis as described above indicated 27.1% residue after heating the film to 550° C. under nitrogen. The DMA data for E' as a function of temperature of the film is shown in FIG. 2, Curve C.

Example 4

The dispersions from Example 2 and Example 3 were blended together by shaking to yield a stable dispersion comprising 50% by weight of each polymer. A free standing film of this sulfopolyurea blend produced as described above had a $T_g$ of 29.0° C. by DMA, was not dispersible in boiling water, had a breaking stress of 33.9 MPa, elongation at break of 363%, no yield stress, and Young's modulus of 152 MPa (FIG. 1, Curve D). TGA analysis as described above indicated 16.1% residue after heating the film to 550° C. under nitrogen. The DMA data for E' as a function of temperature of the film is shown in FIG. 2, Curve D.

Comparative Examples

Comparative analysis (tensile analysis, DMA, and TGA) were conducted using commercially available waterborne polyurethanes listed below as Comparative Examples C1 through C5. Sample films were prepared as described above for Examples 1–4.

| Comparative Example | Sample Description | Source |
|---|---|---|
| C1 | Witcobond ® W-160 | Witco Corp., Greenwich, CT |
| C2 | Witcobond ® W-236 | Witco Corp., Greenwich, CT |
| C3 | Sancure ® 2710 | Sanncore Industries, Inc., Leominster, MA |
| C4 | Sancure ® 2715 | Sanncore Industries, Inc., |
| C5 | Bayhydrol ® 123 | Bayer Corp., Pittsburgh, PA |

Tensile Analysis

Figure 3:
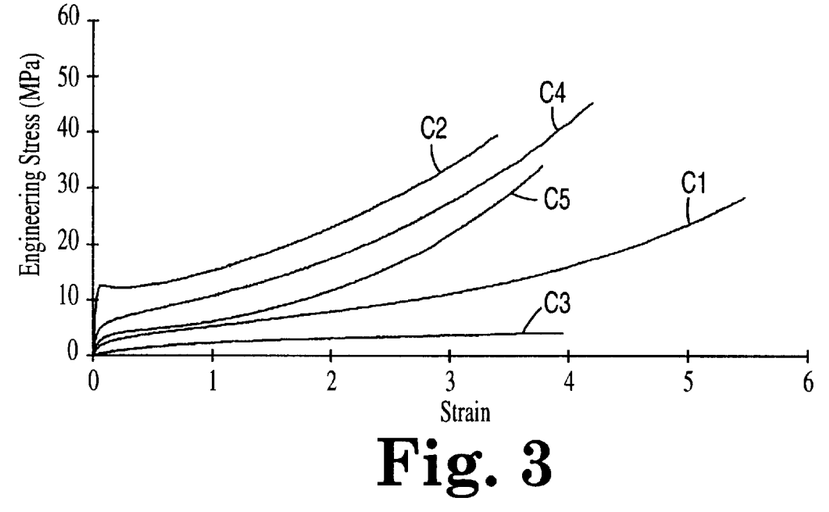
FIG. 3 is a trace of tensile data curves for films prepared from five commercially available waterborne polyurethanes (comparative Examples C1–C5).

Tensile analysis data for Comparative Examples C1–C5 is presented in FIG. 3. The yield stress, strain and breaking strain exhibited by the Comparative Example materials C1–C5 are very similar to those exhibited by the films of the present invention as described in Examples 1–4.

DMA Analysis

Dynamic mechanical analyses were conducted on comparative examples C1–C5 using the procedures described above for examples 1–4 (see FIGS. 4, 5 and 6).

Data from DMA curves for examples 1–4 and C1–C5 (FIGS. 2, 4, 5 and 6) was analyzed to provide a measure of the retention of the storage modulus as a function of increasing temperature. Percent change in E' over the temperature range of 100° C. to 135° C., and percent change in E' over the temperature range of 100° C. to 200° C. is shown below for all samples.

TABLE 1

Δ E' as a Function of Elevated Temperature

| Example | Δ E'$_{(100°–135° C.)}$ | Δ E'$_{(100°–200° C.)}$ |
|---|---|---|
| 1 | −49% | −133% |
| 2 | −77% | −97% |
| 3 | −13% | −17% |
| 4 | −27% | −9% |
| C1 | −126% | —[a] |
| C2 | −148% | —[a] |
| C3 | −219% | —[a] |
| C4 | −902% | —[a] |
| C5 | —[a] | —[a] |

[a]Not measureable due to softening and concomitant drop in modulus below the detection limits of the instrument TGA Analysis Thermal gravimetric analyses were conducted on film samples as described above (see Table 1). After prolonged heating at 550° C. Examples 1–4, prepared according to the teachings of the current invention, yielded hard, brittle residues with final weighs in excess of 12 wt. %, and in some cases in excess of 25 wt. % relative to the original unheated sample. Comparative examples C1 –C5 all showed residual levels below 3 wt. %.

TABLE 2

Residual Weights from TGA Experiment

| Example | Residue |
|---|---|
| 1 | 20.0 wt. % |
| 2 | 12.1 wt. % |
| 3 | 27.1 wt. % |
| 4 | 16.1 wt. % |
| C1 | 0.7 wt. % |

TABLE 2-continued

Residual Weights from TGA Experiment

| Example | Residue |
|---|---|
| C2 | 1.1 wt. % |
| C3 | 2.6 wt. % |
| C4 | 1.3 wt. % |
| C5 | 0.73 wt. % |

Example 5

A reactor equipped with nitrogen purge, mechanical stirrer, and distillation apparatus was charged with Sulfopolyol C (91.2 g) and methyl ethyl ketone (MEK, 300 g). The contents of the reactor were dried by heating the reactor to 120° C. and distilling approximately 50 g MEK, the mixture subsequently cooled to 70° C., and ethane sulfonic acid (0.1 g) was added to the reactor followed by Isonate 2143L (34.9 g, 0.24 moles NCO; NCO:OH of 2.25:1). The reaction mixture was then stirred under dry nitrogen at 70° C. for 6 hours.

A reactor equipped with a pressure equalizing addition funnel and nitrogen purge, mechanical stirrer, and distillation apparatus was charged with deionized water (700 g) and the water heated to boiling. The isocyanate terminated prepolymer described above was added to the water over a period of 1 hour under a heavy nitrogen purge and high speed agitation while MEK was continuously removed. The pressure in the flask was then reduced gradually under aspirator pressure to remove residual MEK and a portion of the water (approximately 225 g). The resulting dispersion (21% solids) was golden and transparent in appearance.

A 19 mil thick free standing film of this sulfopolyurea produced as described in Example 1 had a T$_g$ of 10.4° C., was not dispersible in boiling water, had a tensile strength of 53.5 MPa, elongation at break of 407%, a modulus at 100% elongation of 15.0 MPa.

Example 6

An isocyanate terminated prepolymer was prepared according to the procedure of Example 5 using a charge of Sulfopolyol C (159.0 g, 0.19 moles OH), neopentyl glycol (9.84 g, 0.19 moles OH, available from Aldrich Chemical Co.), and Isonate 2143L (108.27 g, 0.76 moles NCO; NCO:OH of 2:1); the sulfopolyol and neopentyl glycol were azeotroped dry as a mixture. The prepolymer was heated to 70° C. and dispersed in distilled water (700 g) according to the procedure of Example 5.

The resultant dispersion was obtained in 27% solids in water, and was white and translucent in appearance. A film of this polymer prepared as described in Example 1 was tough and transparent, and was insoluble in boiling water. The polymer had a T$_g$ (by DSC) of 46.7° C., a theoretical sulfonate equivalent of 2928 g polymer per mole of sulfonate, a tensile strength of 57.5 MPa, elongation at break of 253%, and modulus at 100% elongation of 39.0 MPa.

Example 7

Isocyanate Terminated Sulfoprepolymer Synthesis

The procedure of Example 2 was repeated using a charge of Sulfopolyol B (62.2 g), Isonate 2143L (62.8 g), and ethane sulfonic acid (0.1 g) to produce a viscous liquid prepolymer with an NCO:OH endcapping ratio of 3:1 NCO:OH.

Sulfopolyurea Dispersion Synthesis

The thus prepared isocyanate-terminated sulfoprepolymer (125 g) was dispersed in water (700 g) according to the procedure of Example 2 to produce a stable, whitish-blue appearing, 18% solids dispersion.

The casting procedures described were used to prepare a free standing film from this dispersion. The film had a $T_g$ of 31.2° C. by DSC, was not dispersible in boiling water, had a breaking stress of 49.1 MPa, elongation at break of 201%, yield stress of 26.7 MPa, and Young's modulus of 713 MPa.

Example 8

An isocyanate terminated prepolymer was prepared according to the procedure of Example 6 using a charge of polyol C (200.0 g, 0.24 moles OH) and Isonate 2143L (68.0 g, 0.48 moles NCO; NCO:OH of 2:1). The prepolymer in methyl ethyl ketone was azeotroped dry, heated to 70° C. and dispersed into distilled water (2500 g) according to the procedure of Example 5.

The resultant dispersion was obtained in 10% solids in water, and was transparent and golden colored in appearance. A film of this polymer prepared as described in Example 1 was tough and transparent, and was insoluble in boiling water. The polymer had a $T_g$ (by DSC) of 1.8° C., a theoretical sulfonate equivalent weight of 2200 g polymer per mole of sulfonate, a tensile strength of 43.8 MPa, and elongation at break of 462%.

Example 9

An isocyanate terminated prepolymer was prepared according to the procedure of Example 5 using a charge of methyl ethyl ketone (800 g), 4,4'-diisocyanatodiphenyl methane (423.1 g, 1.69 moles), and polyol A (467.9 g, 1.54 moles OH; NCO:OH endcapping ratio of 2.2:1). The prepolymer in methyl ethyl ketone was then heated to 70° C. and dispersed into distilled water (2500g) according to the procedure of Example 5.

The resultant stable dispersion was obtained in 28% solids in water, and was translucent bluish in appearance and pH 7. A film of this polymer prepared as described in Example 1 was tough and transparent, and was insoluble in boiling water. The polymer had a theoretical sulfonate equivalent weight of 3416 g polymer per mole of sulfonate, a yield stress of 57.9 MPa at 0.053 strain, a breaking stress of 47.3 MPA, Young's modulus of 1679 MPa, and elongation at break of 162%.

Figure 7:
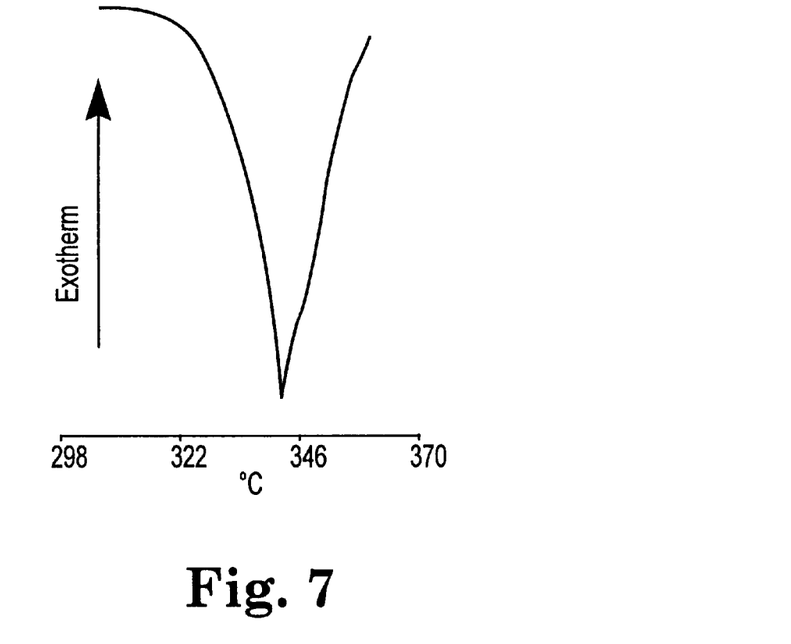
FIG. 7 is a trace of a portion of the Differential Thermal Analysis (DTA) curve of the sulfopolyurea film of Example 9 which shows the $T_m$ of the polymer.
Figure 8:
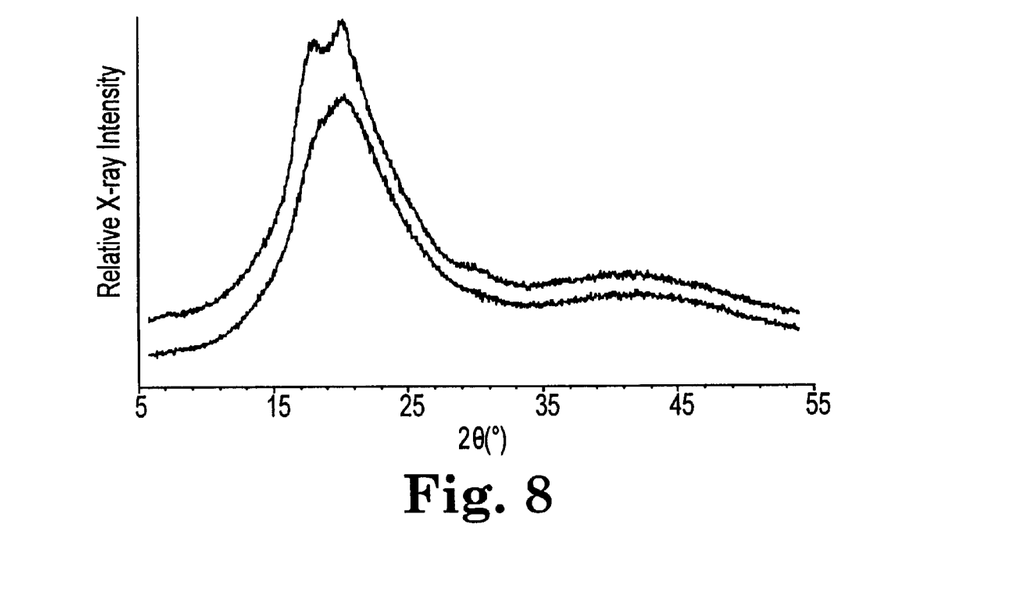
FIG. 8 is a trace of a portion of the wide angle x-ray scattering (WAXS) spectrum of the sulfopolyurea film of Example 9.

A sample of this film was annealed under nitrogen for 10 hours at 110° C. Samples of the original and annealed films were evaluated by wide angle x-ray scattering which showed an increase in order upon annealing (FIG. 7). Differential Scanning Calorimetry of the annealed sample showed a $T_m$ of 342° C.

The increase in order upon annealing is evident by the appearance of discrete scattering intensity in the WAXS spectra of the annealed film. This increase in order maybe associated with the formations of crystalline domaines, an increase in the size of existing crystalline domains, or increased order in existing crystalline domains.

Example 10

A 15 mm thick low density non-woven web weighing 80 g/m² was formed from 13 denier nylon-6,6 fibers on a web-forming machine available under the trade designation "Rando Webber" from Rando Machine Corporation, Macedon, N.Y. The resulting low density web was roll coated with a prebond resin to provide a dry add-on weight of 45 g/m² using a coating solution consisting of 39.3% xylol, 16.1% of a solution of 35 parts methylene dianiline (MDA) and 65 parts 2-ethoxy ethanol acetate, 44.6% ketoxime blocked poly-1,4-butylene glycol diisocyanate having a molecular weight of about 1500 (sold under the trade designation "Adiprene BL-16" by the Uniroyal Chemicals division of Compton & Knowles Corporation) and a trace of a silicone defoamer ("Q2", available from Dow Corning Corporation, Midland, Mich.). The prebond resin was cured to a non-tacky condition by passing the coated web through a convection oven maintained at 150° C. for a residence time of about 7 minutes. The resultant prebonded nonwoven web was about 10 mm thick and weighed about 126 g/m².

An adhesive binder consisting of 39.8% diethylene glycol monoethyl ether, 59% of a base catalyzed phenol-formaldehyde resin having 70% non-volatiles, 1.2% of an aqueous sodium hydroxide solution (1:1 NaOH: water) and 0.06% of a fluorochemical surfactant (available from Minnesota Mining and Manufacturing Company, St. Paul, Minn. under the trade designation "FC 170") was roll coated at the rate of 54 g/m² dry onto the prebonded web described above. The wet adhesive coated web was coated uniformly throughout with 100 grit (average particle size 140 micrometers) aluminum oxide abrasive granules at the rate of 950 g/m² by dispersing the abrasive granules in an air stream which was simultaneously directed onto the web's major surfaces. Segments of the abrasive coated web were then roll coated with the size binder resin using the size resins identified as "A" or "B" to produce adhesive sized webs such that the dry add-on of the size adhesive is 205 grams /m² in the case of resin "A" and 100 g/m² in the case of resin "B". Each sized web was passed through a convection oven maintained at 70° C. for a residence time of 2 to 4 minutes to partially dry and remove all but 20% of the volatiles.

Size Resin "A"

Size resin "A" consisted of 10.52 lbs. of the composition of Example 8 prepared to 30% solids in water that was modified by the addition of 0.3 lb. lubricant "AQUAZINC" zinc stearate emulsion (Witco Corporation, Organics Division, New York, N.Y.), 0.3 lb. of thickener "LAPONITE XLG" powder (Southern Clay Products Inc., Tex.).

Size Resin "B"

Size resin "B" consisted of size resin "A", adjusted to 25% solids, by adding 3% aqueous "METHOCEL F4M" gel (960 grams, 3% solids, available from Dow Chemical Company, Midland, Mich.).

Eight 305 mm square segments of partially dried size resin "A" coated web pieces, were assembled and the assembly placed in a platen press heated at 135° C., compressed to 25.4 mm and then held for 40 minutes to produce to produce an abrasive slab. Each slab was removed from the press and cured further in a convection air oven for 120 minutes at 135° C. After allowing the cured slabs to cool to room temperature, wheels having a 254 mm diameter and 3.18 mm center hole were die cut from the 25.4 mm thick slab. The wheel density was 8.5 grams per cubic inch. The wheel was evaluated for its abrasive performance by rotating it at a surface speed of 5650 fpm while urging a coupon of perforated stainless steel against it such that there was a 10 psi pressure across the contact interface. The test was interrupted every 2 minutes to weigh the test coupon and the wheel. The stainless steel coupon was observed to lose 4.7 grams per 2 minutes while the wheel lost 14.2 grams for the same period.

Thirteen 229 mm×279 mm rectangular segments of partially dried size resin "B" coated web pieces were assembled and the assembly placed in a platen press heated at 135° C., compressed to 25.4 mm and then held for 40 minutes to produce to produce an abrasive slab. The slab was removed from the press and cured further in a convection air oven for 120 minutes at 135° C. After allowing the cured slab to cool to room temperature, a wheel having a 203 mm diameter and 51 mm center hole was die cut from the 25.4 mm thick slab. The wheel density was 12.19 grams per cubic inch. The wheel was evaluated for its abrasive performance by rotating it at 2000 rpm while urging a coupon of perforated stainless steel against it such that there was a 7 psi pressure across the contact interface. The test was interrupted every minute to weigh the test coupon and the wheel. The stainless steel coupon was observed to lose 0.8 to 1 gram per minute while the wheel lost 0.6 to 2 grams for the same period.

We claim:

1. A stable aqueous colloidal dispersion of a sulfopolyurea composition comprising a plurality of units (a) and (b) having the formula:

interconnected by units (c) having the formula wherein;

each $R_1$ is independently a divalent aliphatic group having an average molecular weight of 200 to 600 comprising ether or ester functional groups selected from the group consisting of each $R_2$ is independently a divalent straight or branched chain alkylene group or cycloaliphatic group having an average of 2 to 15 carbon atoms or a divalent aliphatic group having an average molecular weight of 200 to 600 comprising ether or ester functional groups selected from the group consisting of $R_3$ is selected from the group consisting of a methylene-4,4'-diphenyl group, a 1,4-phenyl group, a 4,4'-biphenyl group, a 1,6-napthyl group, a N,N-di((p-methylphenyl)phenyl)-carbodiimide group, and mixtures thereof;

m is an integer from about 2–5;

n is an integer from about 2–15;

x is 1;

y is an integer from 0–4;

z is an integer from 0–6; and

M is a sodium, lithium, or potassium cation;

wherein said sulfopolyurea has a sulfonate equivalent weight of from about 1,000 to about 8,500.

2. The aqueous colloidal dispersion of claim 1 wherein said sulfopolyurea composition has a sulfonate equivalent weight of from about 2,500 to about 7,000.

3. The aqueous colloidal dispersion of claim 1 wherein $R_3$ is a methylene-4,4'-diphenyl group.

4. The aqueous colloidal dispersion of claim 3 comprising colloidal particles having an average particle size less than about 1 micron.

5. The aqueous colloidal dispersion of claim 3 comprising colloidal particles having an average particle size less than about 500 nm.

6. The aqueous colloidal dispersion of claim 3 comprising colloidal particles having an average particle size less than about 100 nm.

7. The colloidal dispersion of claim 1 capable of coalescing into a self-supporting, thermally stable film without the evolution of gaseous by-products or formation of covalent or ionic bonds, said film being capable of maintaining its integrity in boiling water.

8. The colloidal dispersion of claim 1 wherein said sulfopolyurea composition comprises hard domains and soft domains.

9. The colloidal dispersion of claim 8 wherein said hard domains are associated through hydrogen bonding.

10. A thermally stable sulfopolyurea film formed from the colloidal dispersion of claim 1 wherein said film is phase separated into hard and soft domains and is not redispersible in water.

11. The sulfopolyurea film of claim 10 wherein said film is thermally stable to a temperature of at least 200° C.

12. The sulfopolyurea film of claim 10 wherein said film is thermally stable to a temperature of at least 250° C.

13. The sulfopolyurea film of claim 10 wherein said film exhibits a resistance to flow at a temperature of at least 200° C.

14. The sulfopolyurea film of claim 10 wherein said film exhibits a resistance to flow at a temperature of at least 250° C.

15. The sulfopolyurea film of claim 10 wherein DMA analysis of the film according to Test Method A shows less than about a 100% loss in storage modulus between 100–135° C. relative to the film's storage modulus at 100° C.

16. The sulfopolyurea film of claim 10 wherein DMA analysis of the film according to Test Method A shows less than about a 50% loss in storage modulus between 100–135° C. relative to the film's storage modulus at 100° C.

17. The sulfopolyurea film of claim 10 wherein DMA analysis of the film according to Test Method A shows less than about a 150% loss in storage modulus between 100–200° C. relative to the film's storage modulus at 100° C.

18. The sulfopolyurea film of claim 10 wherein DMA analysis of the film according to Test Method A shows less than about a 100% loss in storage modulus between 100–200° C. relative to the film's storage modulus at 100° C.

19. The sulfopolyurea film of claim 10 wherein DMA analysis of the film according to Test Method A shows less than about a 50% loss in storage modulus between 100–200° C. relative to the film's storage modulus at 100° C.

20. The thermally stable sulfopolyurea film of claim 10, wherein, $R_1$ comprising an equimolar mixture of about 400 average molecular weight divalent aliphatic polyoxyethylene groups and about 425 average molecular weight divalent aliphatic polyoxypropylene groups; $R_2$ comprises an equimolar mixture of about 400 average molecular weight divalent aliphatic polyoxyethylene groups and about 425 average molecular weight divalent aliphatic polyoxypropylene groups, and a divalent aliphatic polyoxypropylene group of about 1000 average molecular weight; $R_3$ comprises methylene-4,4'-diphenyl group; x is 1, y is 0 to 1.5, and z is 0 to 5.

21. The thermally stable sulfopolyurea film of claim 10, wherein $R_1$ comprises an equimolar mixture of about 400 average molecular weight divalent aliphatic polyoxyethylene groups and about 425 average molecular weight divalent aliphatic polyoxypropylene groups; $R_2$ comprises an equimolar mixture of about 400 average molecular weight divalent aliphatic polyoxyethylene groups and about 425 average molecular weight divalent aliphatic polyoxypropylene groups, and a divalent aliphatic polyoxypropylene group of about 1000 average molecular weight; $R_3$ comprises methylene-4,4'-diphenyl group; x is 1, y is 1, and z is 0 to 3.

22. The thermally stable sulfopolyurea film of claim 10, wherein $R_1$ comprises about 600 average molecular weight divalent aliphatic polyoxyethylene group; $R_2$ comprises a mixture of two equivalents an about 600 average molecular weight divalent aliphatic polyoxyethylene group and one equivalent of a divalent aliphatic polyoxypropylene group of about 1000 average molecular weight; $R_3$ comprises methylene-4,4'-diphenyl groups; x is 1, y is 1, z is 0 to 5.

23. The thermally stable sulfopolyurea film of claim 10, wherein $R_1$ comprises an about 600 average molecular weight divalent aliphatic polyoxyethylene group; $R_2$ comprises of a mixture of two equivalents of about 600 average molecular weight divalent aliphatic polyoxyethylene group and one equivalent of a divalent aliphatic polyoxypropylene group of about 1000 average molecular weight; $R_3$ comprises methylene-4,4'-diphenyl groups; x is 1, y is 1, z is 0 to 3.

24. A stable aqueous colloidal dispersion which is the reaction product of

(a) an isocyanate-terminated sulfopolyurethane having the formula (b) an isocyanate-terminated polyurethane having the formula

(c) a polyisocyanate having the formula wherein
each $R_1$ is independently a divalent aliphatic group having an average molecular weight of 200 to 600 comprising ether or ester functional groups selected from the group consisting of each $R_2$ is independently a divalent straight or branched chain alkylene group or cycloaliphatic group having an average of 2 to 15 carbon atoms or a divalent aliphatic group having an average molecular weight of 200 to 600 comprising ether or ester functional groups selected from the group of a is an integer from about 1–3;
m is an integer from about 2–5;
n is an integer from about 2–15;
$R_3$ is independently selected from the group consisting of a methylene-4,4'-diphenyl group, a 1,4-phenyl group, a 4,4'-biphenyl group, a 1,6-napthyl group, a N,N-di((p-methylphenyl)phenyl)-carbodiimide group, and mixtures thereof;
M is a sodium, lithium, or potassium cation; and (d) water;
wherein said reaction product has a sulfonate equivalent weight of from about 1,000 to about 8,500.

25. The aqueous colloidal dispersion of claim 24 wherein said reaction product has a sulfonate equivalent weight of from about 2,500 to about 7,000.

26. A heat resistant abrasive article comprising abrasive particles fixed to the abrasive article with a binder formed from a stable, water dispersible sulfopolyurea polymer said sulfopolyurea polymer comprising a plurality of units (a) and (b) having the formula:

interconnected by units (c) having the formula wherein;

each $R_1$ is independently a divalent aliphatic group having an average molecular weight of 200 to 600 comprising ether or ester functional groups selected from the group consisting of —$CH_2$—$CH_2$—($OCH_2$—$CH_2$—)$_n$—, —$C(CH_3)H$—$CH_2$—($OC(CH_3)H$—$CH_2$—)$_n$—, and —O—($CH_2$)$_m$—CO—[—O—($CH_2$)$_m$—CO—]$_n$— groups;

each $R_2$ is independently a divalent straight or branched chain alkylene group or cycloaliphatic group having an average of 2 to 15 carbon atoms or a divalent aliphatic group having an average molecular weight of 200 to 600 comprising ether or ester functional groups selected from the group consisting of —$CH_2$—$CH_2$—($OCH_2$—$CH_2$—)$_n$—, —$C(CH_3)H$—$CH_2$—($OC(CH_3)H$—$CH_2$—)$_n$—, —$CH_2$—$CH_2$—$CH_2$—$CH_2$—($OCH_2CH_2$—$CH_2$—$CH_2$)$_n$—, and —O—($CH_2$)$_m$—CO—[—O—($CH_2$)$_m$—CO—]$_n$— groups;

$R_3$ is selected from the group consisting of a methylene-4,4'-diphenyl group, a 1,4-phenyl group, a 4,4'-biphenyl group, a 1,6-napthyl group, a N,N-di((p-methylphenyl)phenyl)-carbodiimide group, and mixtures thereof;

m is an integer from about 2–5;

n is an integer from about 2–15;

x is 1;

y is an integer from 0–4;

z is an integer from 0–6; and

M is a sodium, lithium, or potassium cation;

wherein said sulfopolyurea has a sulfonate equivalent weight of from about 1,000 to about 8,500.

27. The abrasive article of claim 26 wherein the stable, water dispersible sulfopolyurea polymer has a sulfonate equivalent weight of from about 2,500 to about 7,000.

28. The abrasive article of claim 26 wherein $R_3$ in the stable, water dispersible sulfopolyurea polymer is a methylene-4,4'-diphenyl group.

29. The abrasive article of claim 26 wherein the stable, water dispersible sulfopolyurea is thermally stable to a temperature of at least 200° C.

30. The abrasive article of claim 26 wherein the stable, water dispersible sulfopolyurea is thermally stable to a temperature of at least 250° C.

31. The abrasive article of claim 26 wherein the stable, water dispersible sulfopolyurea exhibits a resistance to flow at a temperature of at least 200° C.

32. The abrasive article of claim 26 wherein the stable, water dispersible sulfopolyurea exhibits a resistance to flow at a temperature of at least 250° C.

33. The abrasive article of claim 26 wherein the binder bonds the abrasive particles to a major surface of a sheet-like backing.

34. The abrasive article of claim 26 wherein the binder bonds the abrasive particles to a nonwoven web.

35. The abrasive article of claim 26 in the form of a shaped mass comprising a mixture of the abrasive particles and the binder.

* * * * *

UNITED STATES PATENT AND TRADEMARK OFFICE
CERTIFICATE OF CORRECTION

PATENT NO. : 6,165,239
DATED : December 26, 2000
INVENTOR(S) : Steven T. Hedrick, Howard S. Creel, Subramanian Krishnan, John J. Stofko, and Wayne K. Larson It is certified that error appears in the above-identified patent and that said Letters Patent is hereby corrected as shown below:

Title page,
Under FOREIGN PATENT DOCUMENTS, please insert WO 95/08583, 03/1995, PCT.

Column 6,
Line 5, "sulfopolyurea (VI) may be prepared" should be -- sulfopolyurea (VII) may be prepared --.

Column 7 and 8,
Before line 40, after sulfopolyurea insert -- VII --.

Column 9,
Line 48, "value:s" should be -- values --.

Column 10,
Line 2, "modulus, of the softened samples" should be -- modulus of the softened samples --.

Column 12,
Line 49, "Zinc: acetate (0.2 g) should be -- Zinc acetate (0.2 g) --.

Column 18,
Line 51, "40 minutes to produce" should be -- 40 minutes --.

UNITED STATES PATENT AND TRADEMARK OFFICE
CERTIFICATE OF CORRECTION

PATENT NO.    : 6,165,239
DATED         : December 26, 2000
INVENTOR(S)   : Steven T. Hedrick, Howard S. Creel, Subramanian Krishnan, John J. Stofko, and Wayne K. Larson It is certified that error appears in the above-identified patent and that said Letters Patent is hereby corrected as shown below:

<u>Column 19,</u>
Line 3, "produce to produce an abrasive" should be -- produce an abrasive --.

Signed and Sealed this

Eighth Day of January, 2002

Attest:

JAMES E. ROGAN
Attesting Officer    Director of the United States Patent and Trademark Office